United States Patent [19]

Marom

[11] Patent Number: 5,796,089

[45] Date of Patent: Aug. 18, 1998

[54] BAR CODE SCANNER WITH SIMPLIFIED AUTO-FOCUS CAPABILITY

[75] Inventor: Emanuel Marom, Tel Aviv, Israel

[73] Assignee: Symbol Technologies, Inc., Holtsville, N.Y.

[21] Appl. No.: 531,498

[22] Filed: Sep. 21, 1995

[51] Int. Cl.[6] ............................................. G06K 7/10
[52] U.S. Cl. ..................... 235/472; 235/470; 235/462
[58] Field of Search ................................. 235/462, 472, 235/467, 454, 470, 468; 250/234, 235, 236

[56] References Cited

U.S. PATENT DOCUMENTS

| | | | |
|---|---|---|---|
| 3,812,459 | 5/1974 | MacNeill et al. | 235/470 |
| 4,843,222 | 6/1989 | Hochgraf | 235/462 X |
| 4,877,949 | 10/1989 | Danielson et al. | 235/462 |
| 4,963,756 | 10/1990 | Quan et al. | 235/472 |
| 4,978,860 | 12/1990 | Bayley et al. | 235/462 |
| 5,019,699 | 5/1991 | Koenck | 235/462 |
| 5,308,966 | 5/1994 | Danielson et al. | 235/462 |
| 5,359,185 | 10/1994 | Hanson | 235/462 |
| 5,414,251 | 5/1995 | Durbin | 235/472 |
| 5,426,288 | 6/1995 | Obata et al. | 235/462 |

Primary Examiner—Donald T. Hajec
Assistant Examiner—Thien Minh Le

[57] ABSTRACT

A bar code scanner for reading a bar code tag includes a collection optical system, a two dimensional array of detectors, rotating means for imparting rotational movement to the array and displacement means for varying the position of one of the collection optical system and the array along an optical axis of the collection optical system.

29 Claims, 8 Drawing Sheets

BAR CODE SCANNER WITH SIMPLIFIED AUTO-FOCUS CAPABILITY

CROSS REFERENCE TO RELATED APPLICATIONS

This application is related to copending application Ser. No. 08/531,748, filed on even date and owned by the assignee of the present application.

BACKGROUND OF THE INVENTION

The present invention relates generally to an optical scanner and more particularly pertains to an optical scanner and method of scanning bar codes which involve simplified auto-focusing apparatus and practices. The subject invention is particularly useful in an optical scanner employing a CCD (charge-coupled-device) array for bar code reading.

Various optical readers and optical scanning systems have been developed heretofore for reading bar code symbols appearing on a label or on the surface of an article. The bar code symbol itself is a coded pattern of indicia comprised of a series of bars of various widths spaced apart from one another to bound spaces of various widths, the bars and spaces having different light reflecting characteristics. The readers and scanning systems electro-optically transform the graphic indicia into electrical signals, which are thereafter decoded into alphanumeric characters that are intended to be descriptive of the article or some characteristic thereof. Such characters are typically represented in digital form and utilized as an input to a data processing system for applications in point-of-sale processing, inventory control, and the like scanning systems of this general type have been disclosed, for example, in U.S. Pat. Nos. 4,251,798; 4,369,361; 4,387,297, 4,409,470; 4,760,248; and 4,896,026, all of which have been assigned to the same assignee as the instant application.

As disclosed in some of the above patents, one embodiment of such a scanning system resides, inter alia, in a hand-held, portable scanning head supported by a user, which is configured to allow the user to aim the head, and more particularly, a light beam, at a target and a symbol to be read.

The light source in a laser scanner is typically a gas laser or semiconductor laser. The use of a semiconductor devices such as a laser diode as the light source in scanning systems is especially desirable because of their small size, low cost and low power requirements. The beam is optically modified, typically by optical elements, such as lenses, mirrors, apertures, etc., to form a beam spot of a certain size at the target distance. It is preferred that the beam spot size at the target distance be approximately the same as the minimum width between regions of different light reflectivity, i.e., the bars or spaces of the symbol.

Bar code symbols are formed from bars or elements that are typically rectangular in shape with a variety of possible widths. The specific arrangement of elements defines the character represented according to a set of rules and definitions specified by the code or "symbology" used. The relative size of the bars and spaces is determined by the type of coding used, as is the actual size of the bars and spaces. The narrowest bar/space of a bar code symbol determines the number of characters per millimeter or per inch and is referred to as the density of the symbol. To encode a desired sequence of characters, element arrangements are concatenated together to form the complete bar code symbol, with each character of the message being represented by its own corresponding group of elements. In some symbologies a unique "start" and "stop" character is used to indicate where the bar code begins and ends, thus defining the pattern to be decoded/identified. A number of different bar code symbologies exist. These symbologies include UPC/EAN, Code 39, Code 128, Codabar, and Interleaved 2 of 5, among others.

A further known symbology is known as two-dimensional (2D) symbology and is discussed in detail in commonly-assigned U.S. Pat. No. 5,243,655 and No. 5,304,786, which are incorporated herein by this reference thereto. Briefly, that symbology involves a variable number of component symbols or "codewords" per row of a nonvolatile electro-optical read-only memory imprinted on a substrate. Codewords in alternating rows are selected from mutually exclusive subsets of a mark pattern, the subsets being defined in terms of particular values of a discriminator function which is illustrated in the referenced patents as being a function of the widths of bars and spaces in a given codeword.

In the scanning systems known in the art, the light beam is directed by a lens or similar optical components along a light path toward a target that includes a bar code symbol on the surface. The scanning systems function by repetitively scanning the light beam in a line or series of lines across the symbol. The scanning component may either sweep the beam spot across the symbol and trace a scan line across the past the symbol, or scan the field of view of the scanner, or do both.

Scanning systems also include a sensor or photodetector which functions to detect light reflected from the symbol. The photodetector is therefore positioned in the scanner or in an optical path in which it has a field of view which extends across and slightly past the symbol. A portion of the reflected light which is reflected off the symbol is detected and converted into an electrical signal. Electronic circuitry or software thereafter decodes the electrical signal into a digital representation of the data represented by the symbol that has been scanned. For example, the analog electrical signal from the photodetector may typically be converted into a pulse width modulated digital signal, with the widths corresponding to the physical widths of the bars and spaces. Such a signal is then decoded according to the specific symbology into a binary representation of the data encoded in the symbol, and to the alphanumeric character so represented.

The decoding process in known scanning systems usually works in the following way. The decoder receives the pulse width modulated digital signal from the scanner, and an algorithm implemented in software attempts to decode the scan. If the start and stop characters and the characters between them in the scan were decoded successfully and completely, the decoding process terminates and an indicator of a successful read (such as a green light and/or an audible beep) is provided to the user. Otherwise, the decoder receives the next scan, performs another decode attempt on that scan, and so on, until a completely decoded scan is achieved or no more scans are available.

Decoding in 2D symbology is discussed particularly and shown in various flowcharts set forth in the 2D symbology patents incorporated by reference and above identified.

Another type of bar code reader is one which incorporates a detector based upon charge coupled device (CCD) technology. CCDs consist of an array of many detectors. The entire symbol is flooded with light from the reader or ambient light, and each CCD detector is sequentially read out to determine the presence of a bar or a space. Such readers are light-weight and easy to use, but require substantially direct contact or placement of the reader on the symbol to enable the symbol to be properly read. Such physical contact of the reader with the symbol is a preferred mode of operation for many applications, or as a matter of personal preference by the user.

The depth of focus of bar code scanners using light emitting diodes (LEDs) is very limited as compared to laser based scanners. Depth of focus is limited typically by geometrical defocusing, which is linear (approximately with f#).

Other efforts have heretofore been made to include, in optical scanners, various apparatus for effecting focusing, particularly on an automated basis.

U.S. Pat. No. 4,978,860 presents a quite simple approach in disclosing an optical system for a bar code scanner for reading a bar code tag which comprises a focusing means, a two dimensional array of detectors is tilted with respect to the principal plane of the focusing means, so that images of the detectors are formed on a surface intersecting the bar code tag, and an image of a portion of the bar code tag is substantially in focus on at least one of the detectors.

The '860 arrangement, however, looks to focusing for a linear bar code, i.e., it seeks a horizontal focus line among the plurality of horizontal lines that exist vertically of a single row bar code. The arrangement thus does not accommodate automatic focusing in respect of two-dimensional symbology.

Another approach is found in U.S. Pat. No. 5,359,185, which discloses an apparatus for focusing an image of optical information over a substantial range of distances, comprising optical means for refracting images of optical information of varying wavelengths to different focal planes along a longitudinal axis at a predetermined reading position, illuminating means for sequentially illuminating optical information with light of different wavelengths, reading sensor means, disposed at the predetermined reading position and having a light receiving plane for converting an image of optical information into an electrical signal, and control means for determining and decoding the reflected light image formed by that wavelength of light from the illuminating means which produces the best focus.

A further prior art endeavor is seen in U.S. Pat. No. 5,192,856, which discloses an apparatus for use in reading a bar code along a scan axis at a distance from a target, the apparatus comprising an electromagnetic signal source for providing an electromagnetic illumination beam at a selected frequency and intensity, an optical train including fixed beam shaping optics for receiving and spreading the illumination beam to exit a housing port and irradiating the bar code completely along the scan axis with the housing at a single position relative to the target and auto-focusing optics for receiving a reflected beam from the bar code and adjusting the focal point of the reflected beam exiting therefrom. A motor is provided for adjusting the position of the auto-focusing optics in dependence on received control signals. A sensor receives the focused reflected beam from the auto-focusing optics and provides electrical signal equivalents thereof. A processor receives the reflected beam electrical signal equivalents, and first generates the auto-focusing optics control signals in accordance with a method comprising the steps of detecting maximum and minimum signal magnitudes in the signal equivalents, digitizing the maximum and minimum signal magnitudes in the signal equivalents, computing a contrast value for the maximum and minimum signal magnitudes in the signal equivalents, and generating the control signals to move the auto-focusing optics by an amount inversely proportional to the magnitude of the computed contrast value. The processor means repeats the method until the control signals have a minimum value wherein the difference between the contrast value and a previously computed contrast value is less than a preselected value and wherein the contrast value is greater than a threshold value.

A still further prior art effort is seen in U.S. Pat. No. 4,877,949, which discloses a bar code reader system comprising bar code sensor means for generating an output signal in accordance with a bar code image incident thereon, distance measurement means for automated reading of distances of a bar code from a hand-held bar code reader over a measurement range which exceeds an operative range for reading of bar codes, reading distance adaptation means for automatically adapting the reader to the reading of a bar code at varying distances therefrom within the operative range by causing an image of the bar code to be substantially focused at the image sensor means, enabling means for enabling a bar code reading operation, and control means coupled with the enabling means and the distance measuring means and operative in response to enabling of a bar code reading operation by the enabling means and in response to reading by the distance measurement means of distances within the operative range for automatically controlling the reading distance adaptation means during movement of the reader relative to a bar code within the operative range to tend to establish and maintain a focused bar code image at the image sensor means.

Apart from the prior art approach of the '860 patent, the above noted schemes for automatic focusing in bar code scanners are seen as unduly complex and costly. However, as noted, the '860 patent approach is limited to linear bar code scanning.

SUMMARY OF THE INVENTION

A primary object of the present invention is to provide an optical scanner and method of scanning bar codes which involve simplified auto-focusing apparatus and practices.

A further object of the subject invention is the provision of an optical scanner and method of scanning which encompasses scanning of two-dimensional symbology.

In accordance with the teachings herein, the present invention provides a bar code scanner for reading a bar code tag, comprising a collection optical system, a two dimensional array of detectors, rotating means for imparting rotational movement to the array to effect tilting of the same and displacement means for varying the position of one of the collection optical system and the array along an optical axis of the collection optical system.

A method in accordance with the invention for use in reading two-dimensional bar codes, comprises the steps of arranging a plurality of transducers in a multiple row array, providing a collection optical system having an optical axis, disposing the array in a first acute angular relation to the optical axis and in a first position along the optical axis, determining the row of the array which is most in-focus among the array rows, displacing the array while in the first angular relation until the center row of the array is most in-focus and repeating the disposing, determining and displacing steps with succeedingly different acute angular relations between the disposition of the array and the optical axis.

BRIEF DESCRIPTION OF THE DRAWINGS

The foregoing objects and advantages of the present invention may be more readily understood by one skilled in the art with reference being had to the following detailed description of preferred embodiments thereof, taken in conjunction with the accompanying drawings wherein like elements are designated by identical reference numerals throughout the several views, and in which.

DETAILED DESCRIPTION OF PREFERRED EMBODIMENTS AND PRACTICES

Figure 1:
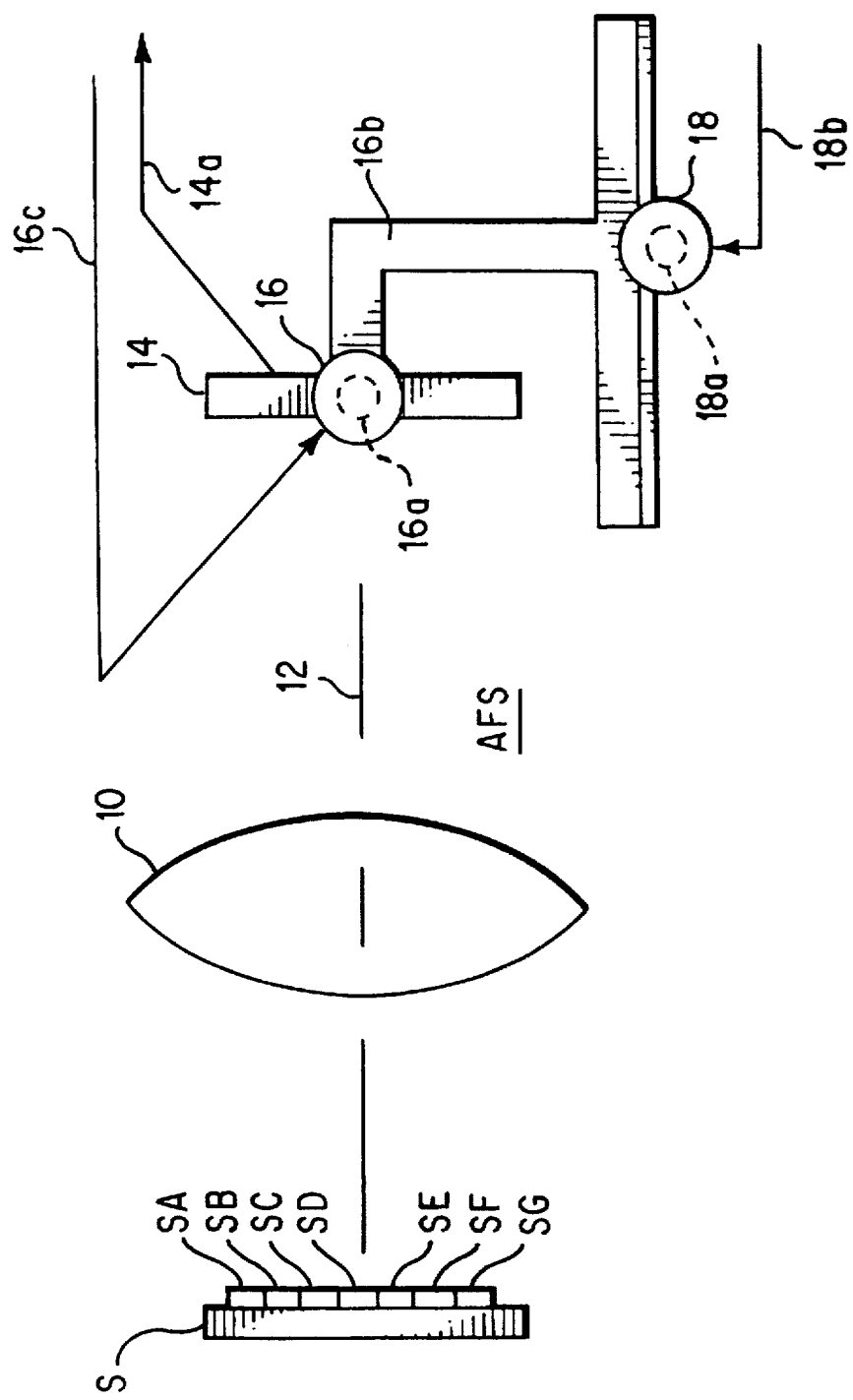
FIG. 1 is a schematic showing of various focusing system components of a scanner in accordance with the invention in sensing relation to symbology S.

Referring to FIG. 1, components of an automatic focusing system (AFS) of the invention include collection optical system 10, which may comprise a single convergent lens, a composite lens structure, or the like, having optical axis 12, detector 14, motor 16 having output shaft 16a supporting detector 14 and adapted to rotate the detector, and motor 18, adapted to translate motor 16 along optical axis 12 through engagement of its output shaft 18a with the undersurface of motor 16 support bracket 16b.

Two-dimensional (2D) symbology S (or 1D symbology) is disposed in the field of view of collection optical system 10 and is comprised of a plurality of rows, rows SA through SG being illustrative.

Detector 14 is preferably a multi-row CCD array having its horizontal center line in registry with motor output shaft 16a. The electrical output signals of detector 14 are provided on lines 14a. Further electrical connection to the FIG. 1 components are provided by lines 16c for controlling motor 16 and by lines 18b for controlling motor 18. As will be understood from ensuing discussion, motor 16 has use in imparting tilt to detector 14 on purpose to search for optimal focus.

Figure 2:
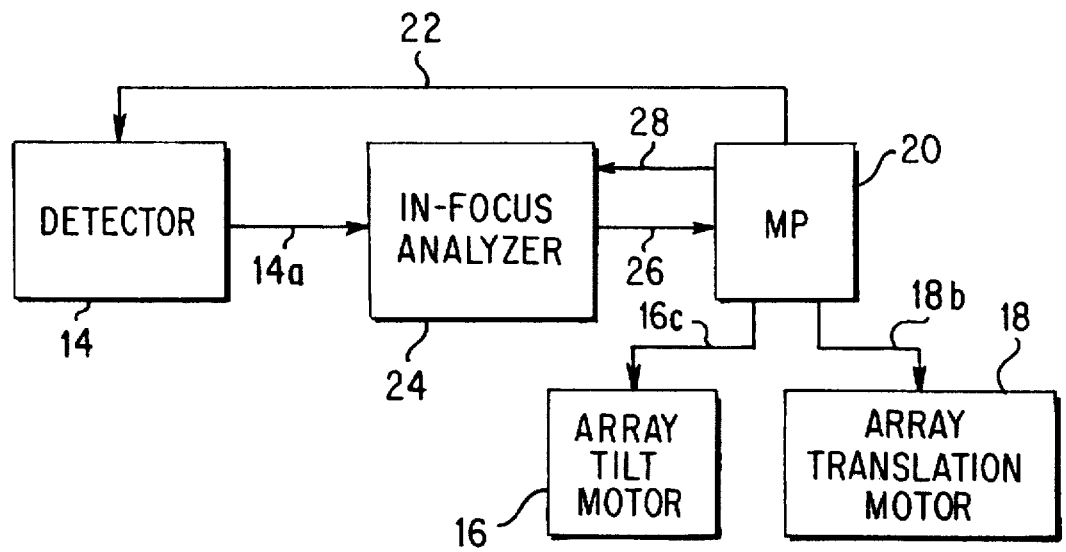
FIG. 2 is a functional block diagram of a first circuit arrangement for use in practicing the invention.

Turning to the circuit arrangement of FIG. 2, microprocessor (MP) 20 furnishes control signals over lines 22 to detector 14 to effect CCD readout. Output lines 14a of detector 14 are connected to the input terminals of in-focus analyzer 24, which furnishes its output over line 26 to microprocessor 20, as called for by the microprocessor by control signals furnished on line 28. As will be developed, the output of the analyzer 24 indicates the row of the CCD array of detector 14 which exhibits highest in-focus condition among all CCD array rows.

Microprocessor 20 executes a program, discussed below in connection with FIGS. 5(a) and 5(b), and thereby provides signals on lines 16c for control of array tilt motor 16 and on lines 18b for control of array translation motor 18.

Figure 3:
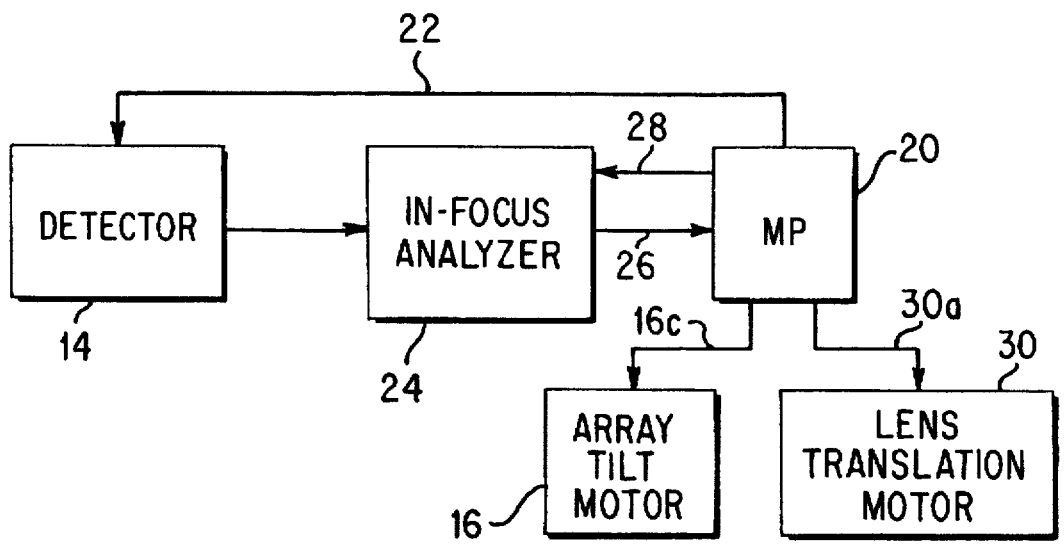
FIG. 3 is a functional block diagram of a second circuit arrangement for use in practicing the invention.

The embodiment of FIG. 3 differs from that of FIG. 2 only in substituting lens translation motor 30 for array translation motor 18. In the FIG. 3 embodiment, lens 10 is supported for movement along optical axis 12 and is translated by motor 30 in response to signals generated by microprocessor 20 on lines 30a in implementing a program, discussed below in connection with FIGS. 6(a) and 6(b).

Figure 4:
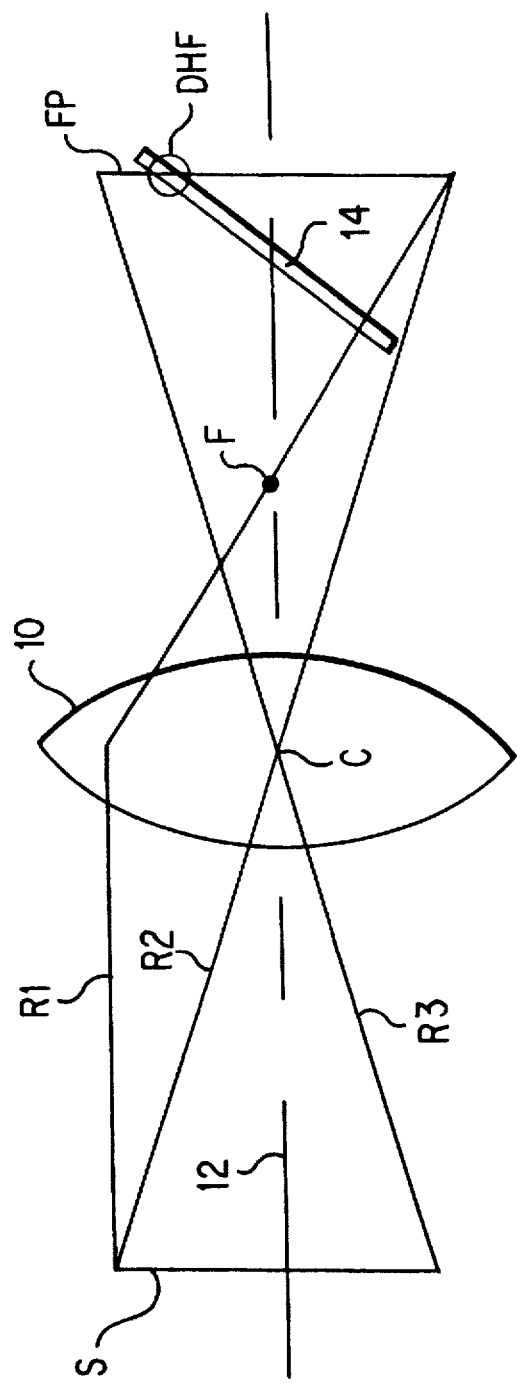
FIG. 4 is a diagram illustrative of the optical fundamentals of the invention.

Turning to the explanatory diagram of FIG. 4, optical lines R1, R2 and R3, lens center C and focus point F of lens 10 establish focal plane FP at which symbology S would be in focus. Detector 14 is shown at a random location and at an acute angle to optical axis 12 and straddling (intersecting) the focal plane. In such disposition of detector 14, the area thereof at or adjacent either side of the focal plane is circled and identified as DHF (detector highest focus) area.

If detector 14 becomes coincident with focal plane FP, all rows of the CCD array thereof would of course be in focus. By providing the detector with tilting capability and translation capability, the FIG. 2 embodiment disposes the detector to attain such focus condition. By providing the detector with tilting capability and the lens with translation capability, the FIG. 3 embodiment likewise disposes the detector to attain such focus condition, as will be seen from the programs executed by microprocessor 20, as now discussed in succession.

Figure 5A:
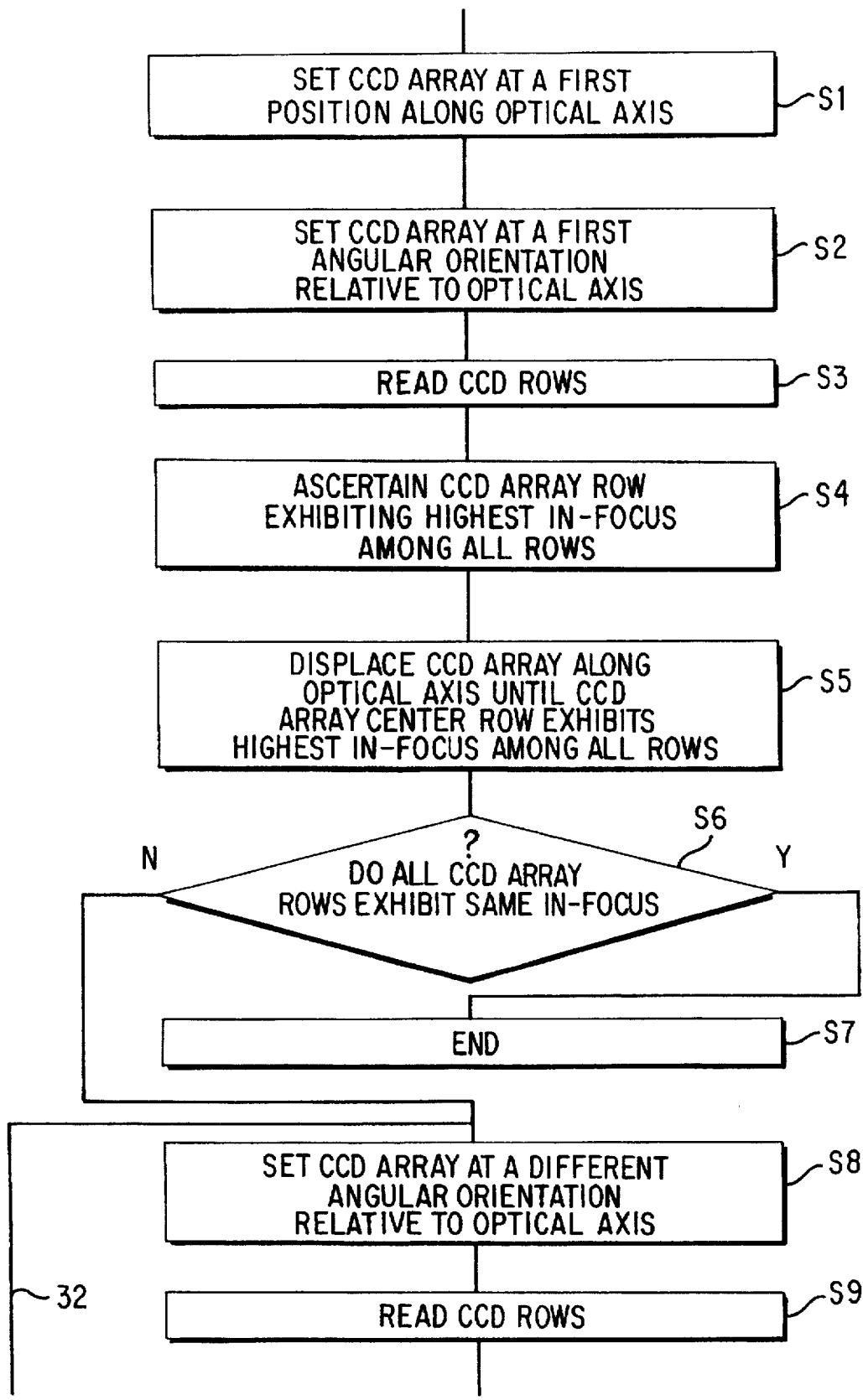
FIGS. 5 (a), 5(b) and 6(a), 6(b) are flow charts of programs implemented in the microprocessor of FIGS. 2 and 3, respectively for use with the first and second circuit arrangements thereof.
Figure 5B:
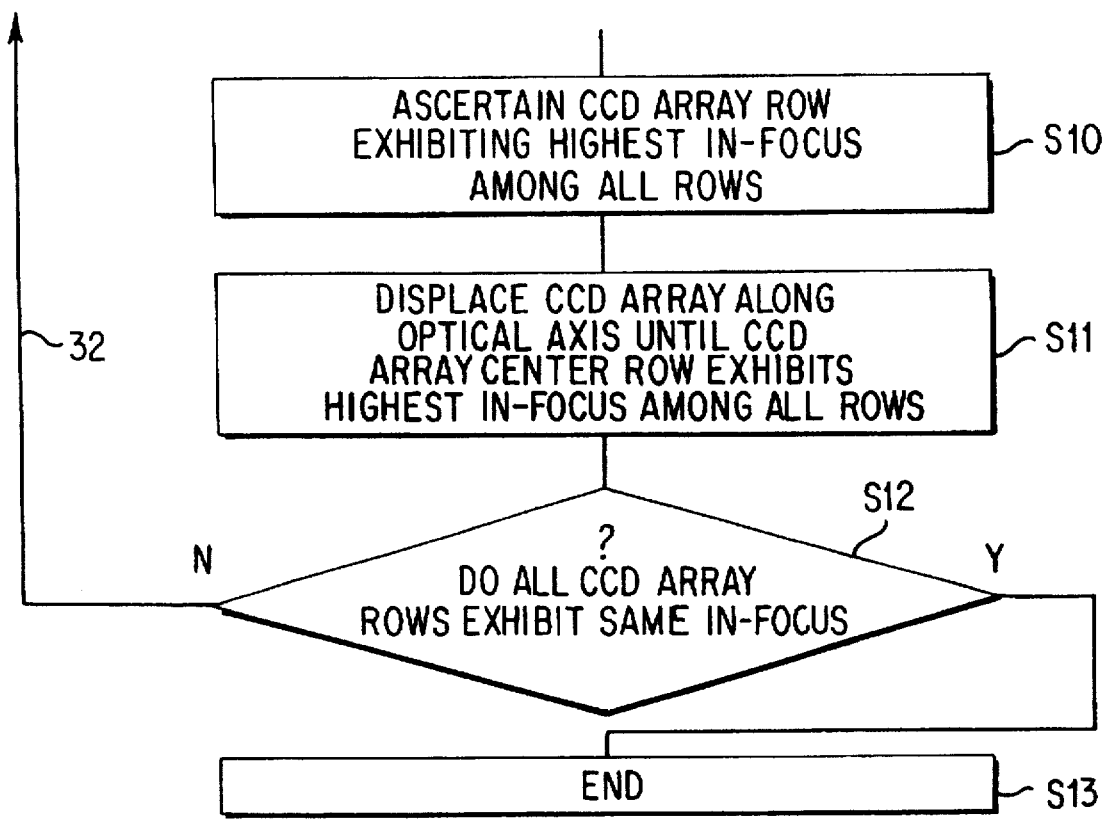

Turning to FIGS. 5(a) and 5(b), in step S1, SET CCD ARRAY AT A FIRST POSITION ALONG OPTICAL AXIS, motor 18 is driven to place the array in a given position along the optical axis. In step S2, SET CCD ARRAY AT A FIRST ANGULAR ORIENTATION RELATIVE TO OPTICAL AXIS, motor 16 is driven to place the array in desired tilted angle orientation to the optical axis. In step S3, READ CCD ROWS, detector 14 is enabled to sense radiant energy incident thereon.

In step S4, ASCERTAIN CCD ARRAY ROW EXHIBITING HIGHEST IN-FOCUS AMONG ALL ROWS, in-focus analyzer 24 identifies the array row which is closest to the focal plane, i.e., DHF in FIG. 4. In this connection, the invention preferably makes use of a "Flash" Fourier transform device, which looks in parallel at all array rows and determines which has the greatest high-frequency content, a known parameter for focus indication.

In step S5, DISPLACE CCD ARRAY ALONG OPTICAL AXIS UNTIL CCD ARRAY CENTER ROW EXHIBITS HIGHEST IN-FOCUS AMONG ALL ROWS, microprocessor 20 drives motor 18 until the Fourier transform device indicates that the center row, i.e., SD of FIG. 1, exhibits the highest in-focus. The motion is leftwardly in the example shown in FIG. 4. The motion of course would be to the right were the DHF to have been in the lower half of the array.

In step S6, ? DO ALL CCD ARRAY ROWS EXHIBIT SAME IN-FOCUS, the Fourier transform device again analyzes the array. Should, by happenstance, the response to the step S6 inquiry be in the affirmative (Y), progress is to step S7, END.

On negative response (N) to the step S6 inquiry, progress is to step S8, SET CCD ARRAY AT A DIFFERENT ANGULAR ORIENTATION RELATIVE TO OPTICAL AXIS, microprocessor 20 drives motor 16 in sense to provide an angular orientation of the array with a lesser tilt relative to the optical axis. Step S9 follows, READ CCD ROWS.

The practice above noted for step S4 is now repeated in step S10, ASCERTAIN CCD ARRAY ROW EXHIBITING HIGHEST IN-FOCUS AMONG ALL ROWS. The practice of step S5 is repeated in step S11, DISPLACE CCD ARRAY ALONG OPTICAL AXIS UNTIL CCD ARRAY CENTER ROW EXHIBITS HIGHEST IN-FOCUS AMONG ALL ROWS. The inquiry of step S6 is repeated in step S12, ? DO ALL CCD ARRAY ROWS EXHIBIT SAME IN-FOCUS. Affirmative response to the inquiry leads to step S13, END.

Negative response to the inquiry gives rise to a return over line 32 to step S8 for further cycling until the step S12 inquiry is answered in the affirmative.

Figure 6A:
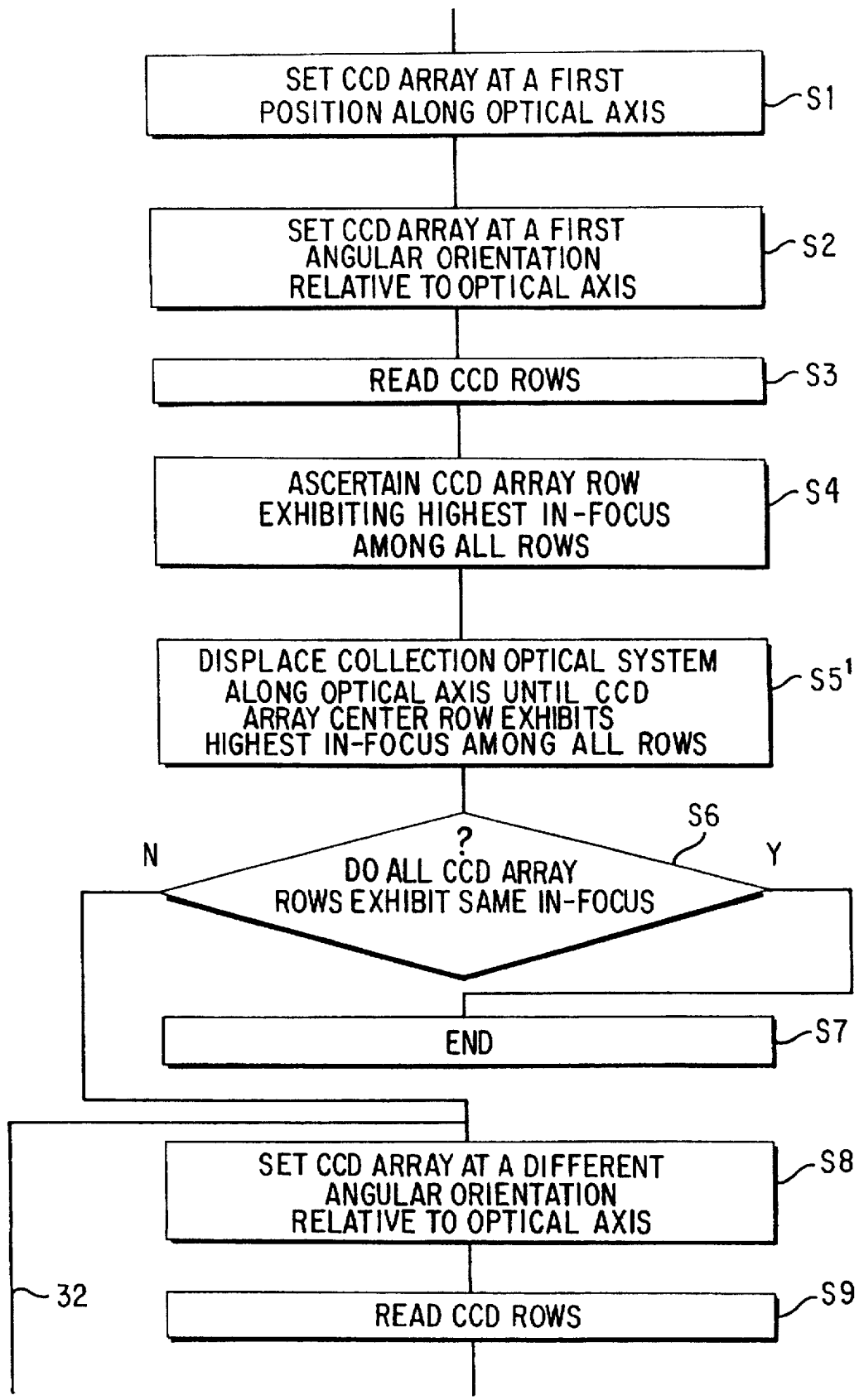
Figure 6B:
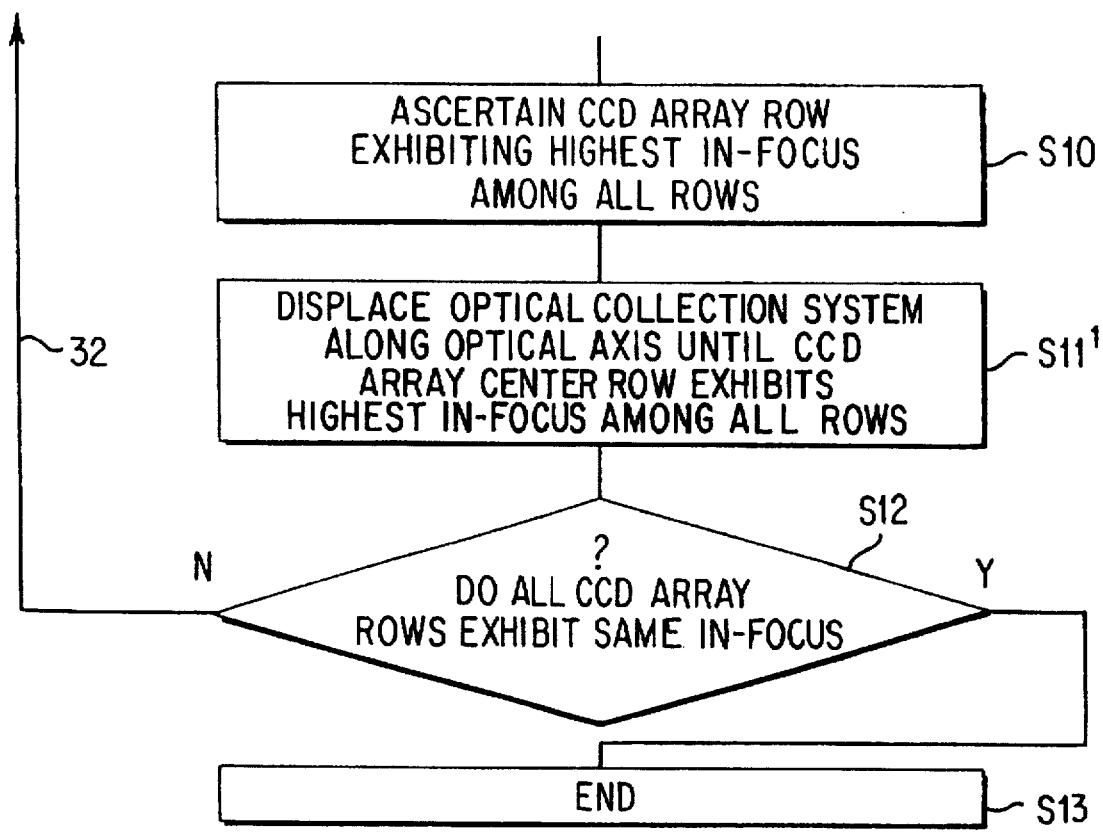

Turning to FIGS. 6(a) and 6(b), all steps of the flow chart will be seen to correspond to those of the flow chart of FIGS. 5(a) and 5(b), except for the steps S5' and S11', both of which are DISPLACE COLLECTION OPTICAL SYSTEM ALONG OPTICAL AXIS UNTIL CCD ARRAY CENTER ROW EXHIBITS HIGHEST IN-FOCUS AMONG ALL ROWS. These steps substitute lens translation for CCD array translation and provide the same results.

While the invention has been described particularly in the application of reading two-dimensional bar codes, it is to be appreciated that it has general application in general optical set-ups for focusing purposes. Thus, an optical image desired to be placed in focus by movement of a focusing lens may be applied to a beam splitter, with one splitter output being conducted to film or the like and the other applied to the tiltable detector array of the invention. The focusing practice of the embodiment of FIG. 2 and the flow charts of FIGS. 6(a) and 6(b) may then be implemented.

Figure 7:
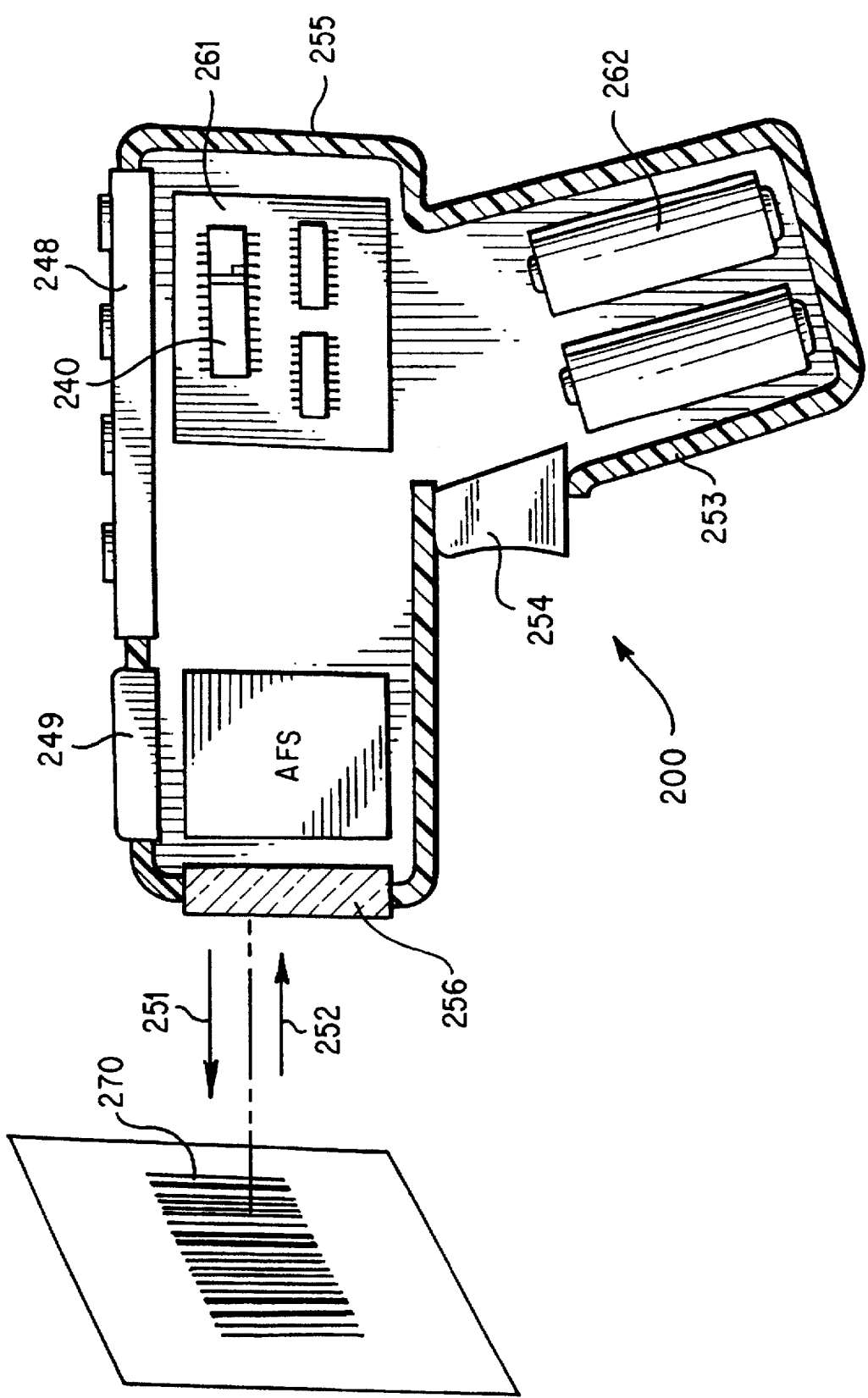
FIG. 7 depicts a hand-held scanner arrangement in which the automatic focusing system of the invention may be embodied.

FIG. 7 illustrates a highly simplified embodiment of one type of bar code reader that may be modified to utilize the optical scanner with an extended depth of focus of the present invention. A reader may be implemented in a hand-held scanner, as illustrated, or a desk-top work station or stationery scanner. In a preferred embodiment, the arrangement is implemented in a housing 255 that includes an exit port through which an outgoing light beam 251 is directed to impinge on, and to be scanned across, symbols 270 (one of plural rows being shown) located exteriorly of the housing.

The hand-held device of FIG. 7 is generally of the style disclosed in U.S. Pat. No. 4,760,248 issued to Swartz, et al., or in U.S. Pat. No. 4,896,026 assigned to Symbol Technologies, Inc., and also similar to the configuration of a bar code reader commercially available as part number LS 2000 from Symbol Technologies, Inc. Alternatively, or in addition, features of U.S. Pat. No. 4,387,297 issued to Swartz, et al. or U.S. Pat. No. 4,409,470 issued to Shepard, et al., both such patents assigned to Symbol Technologies, Inc., may be employed in constructing the bar code reader unit of FIG. 7. These U.S. Pat. Nos. 4,760,248, 4,896,026 and 4,409,470 are incorporated herein by reference, but the general design of such devices will be briefly described here for reference.

Referring to FIG. 7 in more detail, an outgoing light beam 251 is generated in reader 200 and directed to impinge upon a bar code symbol disposed on a target a few inches from the front of the reader unit. The outgoing beam 251 is scanned in a scan pattern, and the user positions the hand-held unit so this scan pattern traverses the symbol to be read. Reflected and/or scattered light 252 from the symbol is processed by automatic focusing system (AFS) as shown in FIG. 1 with associated FIG. 2 circuitry or by an automatic focusing system in accordance with the embodiment of FIG. 3, producing serial electrical signals to be processed and decoded for reproducing the data represented by the bar code. As used hereinafter, the term "reflected light" shall mean reflected and/or scattered light.

In a preferred embodiment, the reader unit is a gun shaped device having a pistol-grip type of handle 253. A movable trigger 254 is employed to allow the user to activate the light beam 251 and detector circuitry when the user has positioned the device to point at the symbol to be read. A light-weight plastic housing 255 contains the light source, the automatic focusing system (AFS), and signal processing circuitry 261, which includes CPU 240 which implements decoding algorithms and thus functions in part as a decoder. A power source in the form of battery 262 is provided. A light-transmissive window 256 in the front end of the housing 255 allows the outgoing light beam 251 to exit and the incoming reflected light 252 to enter. The reader is designed to be aimed at a bar code symbol by the user from a position in which the reader is spaced from the symbol, i.e., not touching the symbol or moving across the symbol. Typically, this type of hand-held bar code reader is specified to operate in the range of perhaps several inches.

The reader may also function as a portable computer terminal, and include a keyboard 248 and a display 249, such as described in the previously noted U.S. Pat. No. 4,409,470.

Although the present invention has been described with respect to reading two dimensional bar codes, it is not limited to such embodiments, but may also be applicable to more complex indicia scanning applications. It is conceivable that the present invention may also find application for use with various machine vision or optical character recognition applications in which information is derived from other types of indicia such as characters or from the surface characteristics of the article being scanned.

By way of summary of the foregoing and introduction to the ensuing claims, the invention will be seen, in one aspect, to provide, in combination, in a bar code scanner, a collection optical system having an optical axis, a detector comprising transducers arranged in a plurality of rows and drive means for rotating the detector about a row thereof and for translating the detector along the optical axis. The transducers desirably comprise CCD elements. Circuit means are provided for receiving electrical signals generated by the transducers and for examining the received electrical signals per row of the detector for frequency content, preferably by effecting Fourier transformations of the received electrical signals per row of the detector and doing so simultaneously. The circuit means particularly provides an output signal indicative of the location in the array of the detector row whose electrical signals have highest frequency content among the rows of the detector. Processor means are provided for receiving the output signal of the circuit means and provide drive signals to the drive means.

In another aspect, the invention provides, in combination, in a bar code scanner, a collection optical system having an optical axis, a detector comprising transducers arranged in a plurality of rows, first drive means for rotating the detector about a row thereof and second drive means for translating the collection optical system along the optical axis.

In a third aspect, the invention provides a bar code scanner for reading two-dimensional symbology, comprising a collection optical system having an optical axis, a multiple row array of transducers providing output signals indicative of energy incident thereon, rotating means for imparting rotational movement to the array about a row thereof, displacement means for varying the position along the optical axis of at least one of the collection optical system and the array and a decoder for receiving all output signals of the sensors and providing output signals indicative of information content of the symbology.

In a fourth aspect, the invention provides a method for use in reading two-dimensional bar codes, comprising the steps of arranging a plurality of transducers in a multiple row array, providing a collection optical system having an optical axis, disposing the array in a first acute angular relation to the optical axis and in a first position along the optical axis, determining the row of the array which is most in-focus among the array rows, displacing the array while in the first angular relation until the center row of the array is most in-focus and repeating the disposing, determining and displacing steps with succeedingly different acute angular relations between the disposition of the array and the optical axis.

In a fifth aspect, the invention provides a method for use in reading two-dimensional bar codes, comprising the steps of arranging a plurality of transducers in a multiple row array, providing a collection optical system having an optical axis, disposing the array in a first acute angular relation to the optical axis and in a first position along the optical axis, determining the row of the array which is most in-focus among the array rows, displacing the collection optical system until the center row of the array is most in-focus and repeating the steps of disposing, determining and displacing with succeedingly different acute angular relations between the disposition of the array and the optical axis.

While several embodiments and variations of the present invention for an automatic focusing system and scanner are described in detail herein, it should be apparent that the disclosure and teachings of the present invention will suggest many alternative designs to those skilled in the art.

What is claimed is:

1. In combination, in a bar code scanner:
   (a) a collection optical system having an optical axis for collecting an image frame;
   (b) a detector array comprising transducers arranged in a plurality of rows adapted for receiving a collected image frame; and
   (c) a projection-independent drive mechanism for rotating said detector about a row thereof and for translating said detector along said optical axis adapted to place the collected image frame in focus on the detector array.

2. The invention claimed in claim 1, wherein said transducers comprise CCD elements.

3. The invention claimed in claim 1, further including circuit means for receiving electrical signals generated by said transducers and for examining said received electrical signals per row of said detector for frequency content.

4. The invention claimed in claim 3, wherein said circuit means effects Fourier transformations of said received electrical signals per row of said detector.

5. The invention claimed in claim 4, wherein said circuit means effects said Fourier transformations simultaneously for each row of said detector.

6. The invention claimed in claim 3, wherein said circuit means provides an output signal indicative of the location in said array of the detector row whose electrical signals have highest frequency content among said rows of said detector.

7. The invention claimed in claim 4, further including processor means for receiving said output signal of said circuit means and providing drive signals to said drive mechanism.

8. In combination, in a bar code scanner:
   (a) a collection optical system having an optical axis for collecting an image frame;
   (b) a detector array comprising transducers arranged in a plurality of rows adapted for receiving a collected image frame;
   (c) a first projection-independent drive mechanism for rotating said detector array about a row thereof; and
   (d) a second projection-independent drive mechanism for translating said collection optical system along said optical axis.

9. The invention claimed in claim 8, wherein said transducers comprise CCD elements.

10. The invention claimed in claim 8, further including circuit means for receiving electrical signals generated by said transducers and for examining said received electrical signals per row of said detector for frequency content in each row of said detector.

11. The invention claimed in claim 10, wherein said circuit means effects Fourier transformations of said received electrical signals per row of said detector.

12. The invention claimed in claim 11, wherein said circuit means effects said Fourier transformations simultaneously for each row of said detector.

13. The invention claimed in claim 10, wherein said circuit means provides an output signal indicative of the location in said array of the detector row whose electrical signals have highest frequency content among said rows of said detector.

14. The invention claimed in claim 13, further including processor means for receiving said output signal of said circuit means and providing drive signals to said first and second drive mechanisms.

15. A bar code scanner for reading a two-dimensional symbology, comprising:
   (a) a collection optical system having an optical axis for collecting an image frame of a two-dimensional symbol;
   (b) a multiple row detector array of transducers providing output signals indicative of energy incident thereon;
   (c) a projection-independent rotating mechanism for imparting rotational movement to said array about a row thereof,
   (d) a projection-independent displacement mechanism for varying the position along said optical axis of at least one of said collection optical system and said array; and
   (e) a decoder for receiving all output signals of said sensors and providing output signals indicative of information content of said symbology.

16. The invention claimed in claim 15, wherein said transducers comprise CCD elements.

17. The invention claimed in claim 15, further including circuit means for receiving electrical signals generated by said transducers and for examining said received electrical signals per row of said array for frequency content in each row of said array.

18. The invention claimed in claim 17, wherein said circuit means effects Fourier transformations of said received electrical signals per row of said array.

19. The invention claimed in claim 18, wherein said circuit means effects said Fourier transformations simultaneously for each row of said array.

20. The invention claimed in claim 17, wherein said circuit means provides an output signal indicative of the location in said array of the row thereof whose electrical signals have highest frequency content among said rows of said array.

21. The invention claimed in claim 20, further including a processor for receiving said output signal of said circuit means and providing drive signals to said projection-independent rotating mechanism and said projection-independent displacement mechanism.

22. A method for use in reading two-dimensional bar codes, comprising the steps of:
   (a) arranging a plurality of transducers in a multiple row array;
   (b) providing a collection optical system having an optical axis;

(c) disposing said array in a first acute angular relation to the optical axis and in a first position along said optical axis;

(d) determining the row of the array which is most in-focus among the array rows;

(e) displacing the array while in the first angular relation until the center row of the array is most in-focus; and (f) repeating steps (c) through (e) with succeedingly different acute angular relations between the disposition of said array and said optical axis.

23. The method claimed in claim 22, wherein said transducers are selected to be CCD elements.

24. The method claimed in claim 22, wherein said step (d) is practiced by effecting Fourier transformations of output signals of said transducers per row of said array.

25. The method claimed in claim 24, wherein said Fourier transformations are effected simultaneously.

26. A method for use in reading two-dimensional bar codes, comprising the steps of:

(a) arranging a plurality of transducers in a multiple row array;

(b) providing a collection optical system having an optical axis;

(c) disposing said array in a first acute angular relation to the optical axis and in a first position along said optical axis;

(d) determining the row of the array which is most in-focus among the array rows;

(e) displacing the collection optical system until the center row of the array is most in-focus; and (f) repeating steps (c) through (e) with succeedingly different acute angular relations between the disposition of said array and said optical axis.

27. The method claimed in claim 26, wherein said transducers are selected to be CCD elements.

28. The method claimed in claim 26, wherein said step (d) is practiced by effecting Fourier transformations of output signals of said transducers per row of said array.

29. The method claimed in claim 28, wherein said Fourier transformations are effected simultaneously.

* * * * *